(12) United States Patent
Fujimoto

(10) Patent No.: US 11,344,969 B2
(45) Date of Patent: May 31, 2022

(54) OVERLAPPING BONDED STRUCTURE

(71) Applicant: NIPPON STEEL CORPORATION, Tokyo (JP)

(72) Inventor: Hiroki Fujimoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 274 days.

(21) Appl. No.: 16/648,651

(22) PCT Filed: Oct. 31, 2018

(86) PCT No.: PCT/JP2018/040600
§ 371 (c)(1),
(2) Date: Mar. 18, 2020

(87) PCT Pub. No.: WO2019/088207
PCT Pub. Date: May 9, 2019

(65) Prior Publication Data
US 2020/0290149 A1    Sep. 17, 2020

(30) Foreign Application Priority Data
Nov. 1, 2017  (JP) .............................. JP2017-211731

(51) Int. Cl.
*B23K 20/12*    (2006.01)
*B62D 21/09*    (2006.01)
(Continued)

(52) U.S. Cl.
CPC .............. *B23K 20/12* (2013.01); *B62D 21/09* (2013.01); *F16B 5/02* (2013.01); *F16B 5/04* (2013.01);
(Continued)

(58) Field of Classification Search
CPC ................. B23K 20/12; B23K 20/122; B23K 2101/006; B62D 21/09; B62D 27/02; B62D 25/00; F16B 5/02; F16B 5/04; F16B 5/08
See application file for complete search history.

(56) References Cited

U.S. PATENT DOCUMENTS

2005/0140158 A1    6/2005  Ogawa et al.
2016/0229465 A1    8/2016  Goto et al.

FOREIGN PATENT DOCUMENTS

EP    2116322 A1     11/2009
EP    2116322 B1  *  1/2012  ............. B23K 11/11
(Continued)

OTHER PUBLICATIONS

International Search Report (PCT/ISA/210) for International Application No. PCT/JP2018/040600, dated Dec. 18, 2018, with English translation.
(Continued)

*Primary Examiner* — Lee A Holly
(74) *Attorney, Agent, or Firm* — Birch, Stewart, Kolasch & Birch, LLP

(57) ABSTRACT

The present invention provides an overlapping bonded structure in which breaking of a bonded section at holes formed during bonding can be prevented when an overlapping section formed by overlapping a plurality of meal plate members is bonded by means of a mechanical bonding means or a friction stir spot-welding means. This overlapping bonded structure, in which overlapping portions of a plurality of plate members are spot-welded at a plurality of bonded sections by means of a mechanical bonding means or a friction stir spot-welding means, and in the bonded sections a hole into which the mechanical bonding means is inserted or a hole formed during the spot-welding by the friction stir spot-welding means exists in at least one plate member, is characterized in that a cutout recess is formed (Continued)

between adjacent bonded sections, from an end portion of the overlapping section in the bonded-section direction, in the overlapping section of at least one of the plate sections, and when the inner diameter of the hole is K, an inside bottom portion of the cutout recess is formed at a position having a depth of K or greater from the end portion of the overlapping section.

20 Claims, 14 Drawing Sheets

(51) Int. Cl.
  *F16B 5/04* (2006.01)
  *F16B 5/08* (2006.01)
  *F16B 5/02* (2006.01)
  *B23K 101/00* (2006.01)
(52) U.S. Cl.
  CPC .............. *F16B 5/08* (2013.01); *B23K 20/122* (2013.01); *B23K 2101/006* (2018.08)

(56) References Cited

FOREIGN PATENT DOCUMENTS

| JP | 55-51909 U | 4/1980 |
| JP | 60-36376 U | 3/1985 |
| JP | 60-125405 A | 7/1985 |
| JP | 7-172344 A | 7/1995 |
| JP | 2000-272541 A | 10/2000 |
| JP | 2005-119577 A | 5/2005 |
| JP | 2006-258205 A | 9/2006 |
| JP | 2008-30100 A | 2/2008 |
| JP | 2013-220794 A | 10/2013 |
| JP | 2015-78722 A | 4/2015 |
| JP | 2015-127062 A | 7/2015 |
| JP | 2017-6975 A | 1/2017 |
| WO | WO 2009/001498 A1 | 12/2008 |

OTHER PUBLICATIONS

Written Opinion of the International Searching Authority (Form PCT/ISA/237) for International Application No. PCT/JP2018/040600, dated Dec. 18, 2018, with English translation.

* cited by examiner (A)

(B)

(A)

(B)

(A)                    (B)

(A)

(B)

(A)

(B)

(C)

OVERLAPPING BONDED STRUCTURE

FIELD

The present invention relates to a lap joint structure comprised of a plurality of overlapping sheet members cut out from a sheet or sheet members formed from a sheet and with overlapping parts joined by a plurality of non-melting joined parts.

BACKGROUND

In the past, in the automotive field, spot welding has been made much use of for assembling car bodies, attaching parts, etc. Pluralities of steel sheet members including high strength steel sheets are also being joined by spot welding. However, in a spot welded joint including steel sheets with a tensile strength of 780 MPa or more, the toughness of the nuggets falls and stress concentrates at the nugget ends in the peeling direction, so there is the problem that even if the steel sheets increase in tensile strength, the cross tensile strength (CTS) will not increase or will decrease. As one art for solving this problem, there is the art of mechanically joining a plurality of metal sheets using rivets, screws, or other mechanical joining means without causing the matrix material to melt. By using this art, there is a possibility that auto parts can be produced higher in reliability of strength than the past.

Further, in the body of a car etc., for the purpose of lightening the weight, sometimes combinations of different materials such as steel sheets and aluminum sheets or steel sheets and carbon fiber reinforced plastic (CFRP) sheets are joined. If in this way the materials combined are materials with different melting points, linear expansion coefficients, and other physical properties, the materials are fastened and joined by mechanical joining means such as described in for example PTLs 1 and 2. Further, in aluminum sheets with their low electrical resistances, sometimes friction stir spot joining is used instead of resistance spot welding.

CITATION LIST

Patent Literature

[PTL 1] Japanese Unexamined Patent Publication No. 2000-272541
[PTL 2] Japanese Unexamined Patent Publication No. 2005-119577

SUMMARY

Technical Problem

If joining overlapping parts of a plurality of overlapping sheet members by blind rivets or other mechanical joining means at joined parts, the joined parts of the members are formed with holes through which the rivets are passed. Further, if spot joining overlapping parts by friction joining means, the joined parts of the sheet members at the rotary tool side are left with holes formed by the indentation marks of the probe at the tip of the rotary tool. In the studies of the inventors, in a lap joint member joining overlapping parts by a mechanical joining means or friction joining means, if the lap joint member as a whole receives tensile deformation, strain concentrates at the holes formed at the joined parts and, as shown in Test No. 1 of FIG. 19 showing the results of a tensile test in the later explained examples, there is the problem of the sheet members breaking starting from the holes due to small deformation. Note that, in the present invention, sometimes the mechanical joining means and friction stir spot joining will be referred to together as "non-melting joining means".

Therefore, the present invention has as its object to provide a lap joint structure of a lap joint member able to keep sheet members from breaking starting from holes formed at the time of joining the members when joining overlapping parts formed by a plurality of overlapping sheet members by non-melting joining means.

Solution to Problem

In the present invention, to deal with such a problem, the inventors studied means for dispersing strain so that strain does not concentrate at the end parts of holes formed at the joined parts. As a result, they obtained the discovery that by forming cutaway recessed parts at the overlapping parts of sheet members between adjacent joined parts in the direction from the end parts of the overlapping parts to the joined part sides, the structure becomes one dispersing strain due a tensile load and fracture of the lap joint member starting from the holes is suppressed. The present invention was made based on such a discovery and has as its gist the following:

(1) A lap joint structure comprised of a plurality of sheet members with an overlapping part joined at a plurality of joined parts in a point manner by mechanical joining means or friction stir spot joining means and with the joined parts formed with, at least at one of the sheet members, holes through which the mechanical joining means are inserted or holes formed at a time of spot joining by the friction stir spot joining means, in which lap joint structure, the overlapping part of at least one of the sheet members among the above sheet members is formed with a cutaway recessed part between adjacent joined parts in a direction from an end part of the overlapping part to the joined parts, and an inside bottom part of the cutaway recessed part is formed at a position of K or more apart from the end part of the overlapping part, where K is an inside diameter of the hole.

(2) The lap joint structure according to the above (1) wherein the hole is positioned so that a distance L between an end part of the hole and an end part of a sheet member at which the cutaway recessed part is formed satisfies relationship of L≥0.8K with respect to the inside diameter K of the hole.

(3) The lap joint structure according to the above (1) or (2) wherein the hole is a through hole passing through the at least one of the sheet members.

(4) The lap joint structure according to any one of the above (1) to (3) wherein a shortest distance between an end part of the hole and an end part of the cutaway recessed part is 0.8K or more.

(5) The lap joint structure according to any one of the above (1) to (4) wherein the cutaway recessed part is formed in at least a sheet member where the hole is formed.

(6) The lap joint structure according to any one of the above (1) to (5) wherein the inside bottom part of the cutaway recessed part is formed sunken in from the end part of the overlapping part over a range of up to 1.5K or more.

(7) The lap joint structure according to any one of the above (1) to (6) wherein the inside bottom part of the cutaway recessed part has a parallel part parallel with the end part of the overlapping part.

(8) The lap joint structure according to the above (7) wherein a length of the parallel part is 0.5K or more.

(9) The lap joint structure according to any one of the above (1) to (8) wherein the sheet member formed with the cutaway recessed part is a hat-shaped member with bent parts formed at an opposite side to the end part of the overlapping part across the joined parts and with a hat-shaped cross-section and the cutaway recessed part is formed over a range from the bent parts of the hat-shaped member to an end part side.

(10) The lap joint structure according to any one of the above (1) to (9) wherein the sheet members are steel sheet members and the cutaway recessed part is formed in a steel sheet member with a tensile strength of 590 MPa or more.

(11) The lap joint structure according to any one of the above (1) to (10) wherein the mechanical joining means are any of blind rivets, self piercing rivets, drill screws, bolts, and resistance element welding.

(12) The lap joint structure according to any one of the above (1) to (11) wherein joining by a resin is jointly used in addition to joining by the mechanical joining means or friction stir spot joining means.

Advantageous Effects of Invention

According to the present invention, when joining a plurality of metal sheet members or CFRP sheet members by non-melting joining means, it is possible to keep the joined parts from breaking starting from the holes through which mechanical joining means are passed or holes formed at the time of spot joining by friction stir spot joining means. As a result, for example, it is possible to produce high strength auto parts excellent in performance in protecting passengers at the time of collision.

BRIEF DESCRIPTION OF DRAWINGS

FIGS. 3(A) and 3(B) are cross-sectional views of the lap joint member shown in FIG. 2, wherein FIG. 3(A) is a cross-sectional view shown by the arrow IIIA-IIIA and FIG. 3(B) is a cross-sectional view shown by the arrow IIIB-IIIB.

FIGS. 7(A) and 7(B) are views for explaining the positions of holes of the joined parts, wherein FIG. 7(A) shows the case where end parts of the sheet members at the overlapping parts match and FIG. 7(B) shows the case where the end parts of the sheet members do not match (case where end parts of sheet members forming the cutaway recessed parts are positioned at joined part sides from other end parts).

FIGS. 11(A) and 11(B) are cross-sectional views for explaining the general configuration of the lap joint member 7 according to FIG. 9 and FIG. 10, wherein FIG. 11(A) is a cross-sectional view shown by the arrow XA-XA in FIG. 10 and FIG. 11(B) is a cross-sectional view shown by the arrow XB-XB in FIG. 10.

FIGS. 15(A) and 15(B) are views for explaining an example of application of the lap joint structure of the present invention to the B-pillar of an automobile, wherein FIG. 15(A) is a perspective view showing the B-pillar and FIG. 15(B) is a view enlarging the range shown by the two-dot chain line B in FIG. 15(A).

FIGS. 16(A) to 16(C) are views for explaining an example of application of the lap joint structure of the present invention to a roof rail of an automobile, wherein FIG. 16(A) is a perspective view showing the roof rail, FIG. 16(B) is a view enlarging the range shown by the two-dot chain line B in FIG. 16(A), and FIG. 16(C) is a view enlarging the range shown by the two-dot chain line C in FIG. 16(A).

FIGS. 17(A) and 17(B) are views for explaining an example of application of the lap joint structure of the present invention to a bumper of an automobile, wherein FIG. 17(A) is a perspective view showing the bumper and FIG. 17(B) is a view enlarging the range shown by the two-dot chain line B in FIG. 17(A).

FIGS. 18(A) to 18(C) are views for explaining an example of application of the lap joint structure of the present invention to a B-pillar outer reinforcement of an automobile, wherein FIG. 18(A) is a perspective view showing the B-pillar outer reinforcement, FIG. 18(B) is a cross-sectional view shown by the arrow XVIB-XVIB in FIG. 18(A), and FIG. 18(C) is similarly a cross-sectional view shown by the arrow XVIC-XVIC.

DESCRIPTION OF EMBODIMENTS

First, as a lap joint structure, an example where one sheet member is a hat-shaped member and the other sheet member is a sheet-shaped member will be used to explain a basic embodiment of the present invention.

Figure 1:
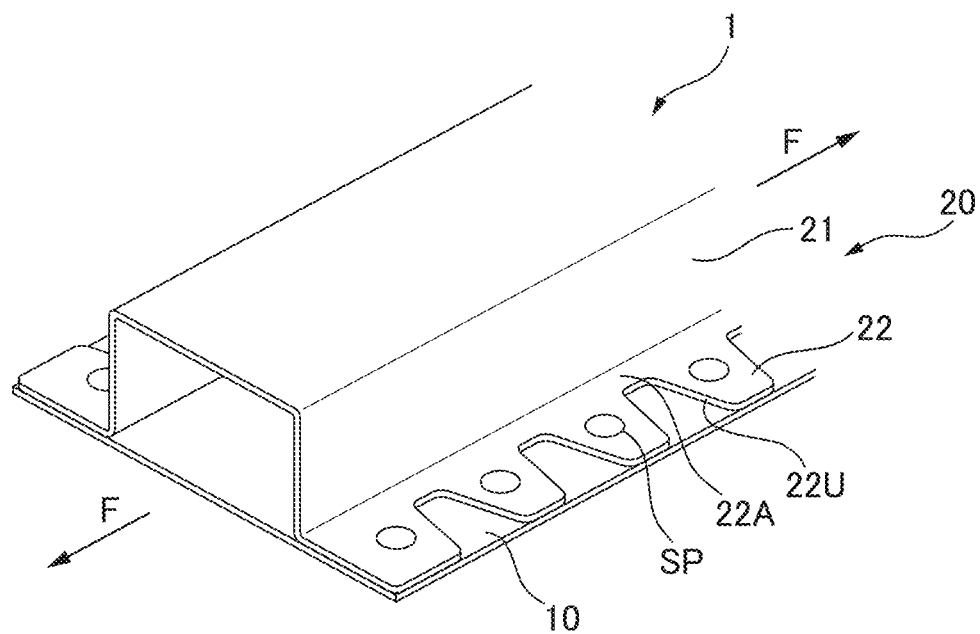
FIG. 1 is a perspective view for explaining the schematic configuration of a lap joint member of the present invention.
Figure 2:
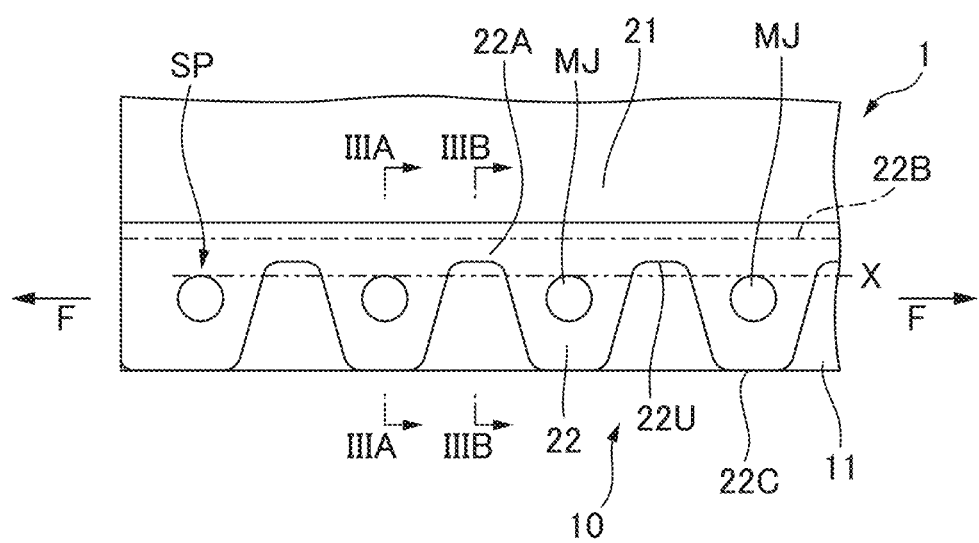
FIG. 2 is a view of the lap joint member shown in FIG. 1 seen from the sheet thickness direction.

The lap joint member 1, as shown in FIGS. 1 and 2, is provided with a sheet-shaped member 10, a hat-shaped member 20, and a plurality of joined parts SP made by non-melting joining means (joined parts) and is configured by joining overlapping parts comprised of overlapping flange parts 11 of the sheet-shaped member 10 and flange parts of the hat-shaped member 20 (flange pieces 22) by blind rivets or other mechanical joining means or friction stir spot joining means.

At the flange parts of the hat-shaped member 20, cutaway recessed parts 22U are formed from the outside end parts 22C of the overlapping parts between adjacent joined parts SP and joined parts SP. Due to this, the flange parts of the hat-shaped member 20 are provided with pluralities of flange pieces 22 and connecting parts 22A connecting the flange pieces 22. Between adjacent flange pieces 22 and flange pieces 22, cutaway recessed parts 22U are formed.

Figure 3:
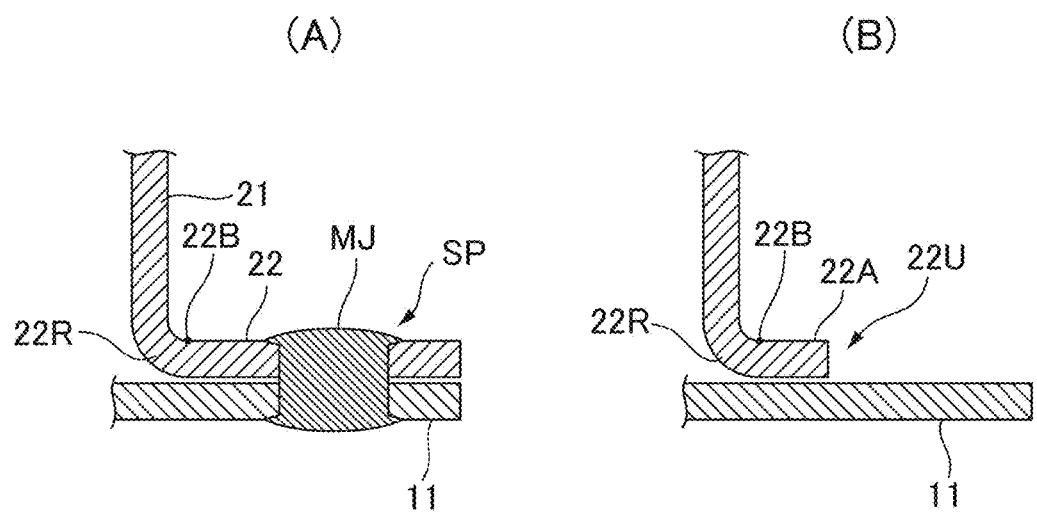

The cutaway recessed parts 22U, in the example of FIGS. 1 and 2, are formed in the end parts 22C of the flange parts of the hat-shaped member 20 and formed sunken in to the insides of the flanges more than the borderline (line X connecting end parts of holes) formed connecting the outer circumferences of the adjacent joined parts SP at the opposite sides to the end parts 22C. Further, the cutaway recessed parts 22U, as shown in FIGS. 3(A) and 3(B), are set so as to form connecting parts 22A in ranges not reaching the bending starting points (other flange end parts) 22B of the corners R transitioning to the bent parts 22R at the upright wall part 21 sides from the flange parts of the hat-shaped member 20.

In this lap joint member 1, one or both of the sheet-shaped member 10 and hat-shaped member 20 forming the flanges is made (a) a steel sheet member obtained by cold pressforming a steel sheet (for example, high strength steel sheet with a tensile strength of 590 MPa or more) or (b) a hot stamped material formed with a martensite structure by shaping a steel sheet for hot stamped material use by hot stamping (for example, steel sheet member with a tensile strength of 1200 MPa or more). Further, it is possible to make one member an aluminum material and the other a steel sheet of (a) or (b) or make both an aluminum material. Similarly, one member may be a CFRP material or both may be CFRP materials.

As explained above, when overlapping parts of a plurality of sheet members are joined by non-melting means, the joined parts of at least one of the members are formed with holes through which mechanical joining means are inserted or holes accompanying friction stir spot joining. For example, when applying non-melting joining means to joining steel sheet members of a structural member of a car body, strain will concentrate at the edges of the holes due to the application of load at the time of collision and breakage will easily occur. However, in the lap joint member 1, cutaway recessed parts 22U are formed between the nonmelting joining means (joined parts) of the overlapping parts, so even if external force is applied to the lap joint member 1 and tensile stress occurs in the direction of the arrow mark F, the cutaway recessed parts can disperse the load and deformation due to the tensile load (i.e., the cutaway recessed parts can absorb deformation and the elongation up to break can be increased), so the joint member is kept from breaking starting from the holes and the performance of the joint member can be fully enjoyed.

While details will be explained later, such an advantageous effect of the cutaway recessed parts was confirmed by the following experiment: That is, test pieces (A), (B), and (C) before the tensile tests shown in FIG. 4 were prepared. For each test piece, two steel sheet base materials comprised of overlapping cold rolled steel sheets with tensile strengths of 980 MPa and 590 MPa and with narrowed center parts in shape were used. The test piece of (A) was comprised of just the two overlapping base materials, the test piece of (B) was comprised of the base materials joined by a blind rivet at a position near the left at the center part and formed with a hole by the mechanical joining, and the test piece of (C) was comprised of the test piece of (B) with a cutaway recessed part provided at the right side of the blind rivet.

Figure 4:
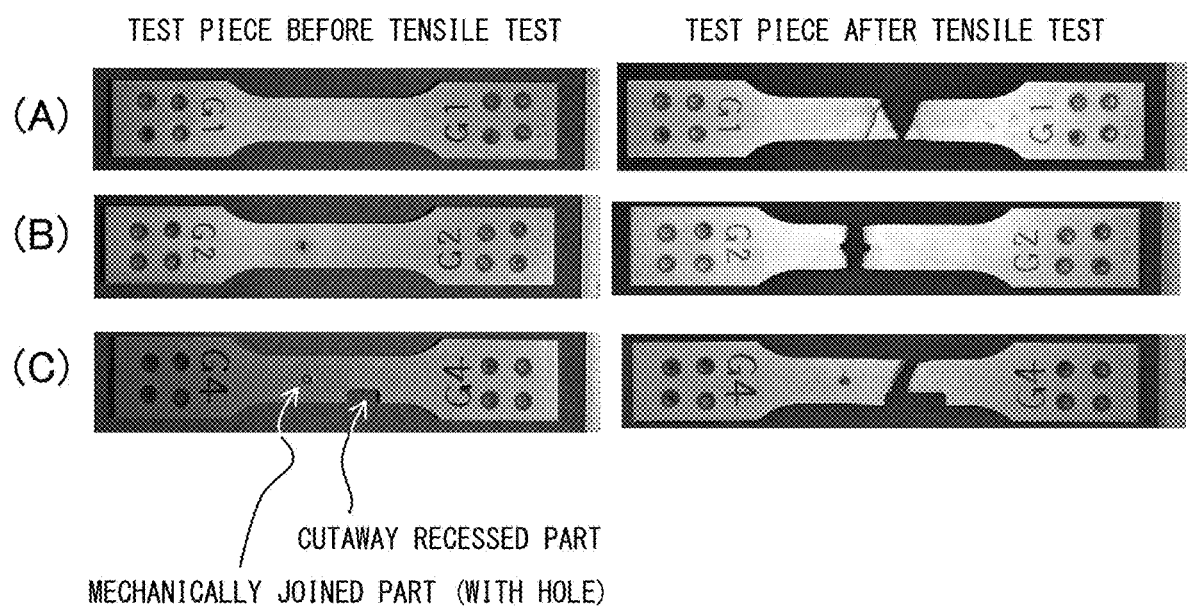
FIG. 4 gives photos showing the state of a test piece before and after a tensile test for confirming the advantageous effect of the present invention, wherein (A) shows the case of using a test piece comprised of two same overlapping test pieces, (B) shows the case of using a test piece comprised of two same overlapping test pieces mechanically joined by a blind rivet, and (C) shows the case of using a test piece further providing the test piece of (B) with a cutaway recessed part.
Figure 5:
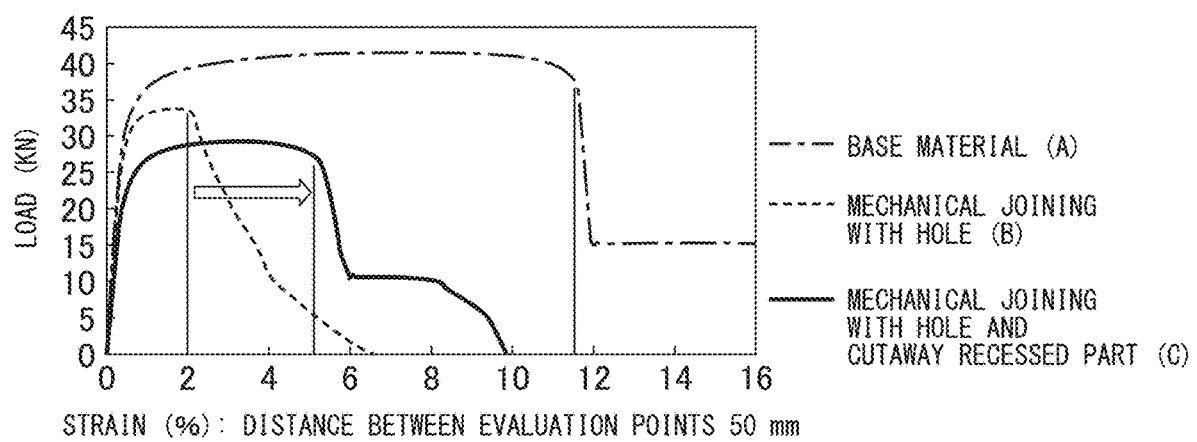
FIG. 5 is a diagram of load-strain curves showing the results of tensile tests for confirming the advantageous effect of the present invention.

The test pieces (A) to (C) were used for tensile tests. FIG. 4 shows the states of breakage of test pieces after tensile tests while FIG. 5 shows load-strain curves when applying tensile loads to the test pieces. As shown in FIG. 4, the test piece (B) not provided with the cutaway recessed part broke centered about the hole of the joined part, while the test piece (C) provided with the cutaway recessed part broke starting near the corner part of the cutaway recessed part. As shown in FIG. 5, it was confirmed that the amount of strain at which breakage occurs with respect to the tensile load also remarkably increases in the test piece (C) compared with the test piece (B). This is because at the test piece (C), when a tensile load is applied, strain is kept from concentrating at the edge of the hole through which the blind rivet is passed and the amount of deformation at which the lap joint member breaks increases. Due to such a mechanism, it may be considered that breakage is kept from occurring by a small strain starting from the edge of the hole provided at the mechanically joined part.

In this way, the present invention joins a plurality of sheet members by a lap joint by a mechanical joining means or friction stir spot joining means. At this time, cutaway recessed parts are provided between the joined parts formed by mechanical joining means and the friction stir spot joining means. Below, the individual requirements and preferable requirements for forming the present invention will be further explained.

Lap Joint Member

The lap joint member of the present invention is configured by overlaying a plurality of sheet members and mechanically joining the sheet members at the overlapping parts or joining them by friction stir spot joining means. For example, as shown in FIGS. 1 and 2, the flange parts (corresponding to flanges) 11 of the sheet-shaped member (sheet member) 10 and the flange parts (comprised of the flange pieces 22 and their connecting parts 22A) of the hat-shaped member (sheet member) 20 are overlaid and the metal sheet members are joined by the joined parts SP by mechanical joining means at the overlapping parts where the flange parts 11 and plurality of flange pieces 22 are overlaid.

Such a lap joint member is for example applied to various structures such as monocoque bodies for forming car bodies and A-pillars, B-pillars, and other auto parts (Assy parts) for forming monocoque bodies.

As the sheet members, sheet-shaped members cut out in predetermined shapes from steel sheets or aluminum sheets or other metal sheets or CFRP sheets are used. Furthermore, shaped members formed into predetermined shapes from these sheet-shaped members are also used. A plurality of sheet-shaped members or shaped members are combined and overlaid at least in part then joined at the overlapping parts by non-melting joining means (mechanical joining means or friction stir spot joining means). The overlapping parts of the sheet members are generally flanges (overlapping parts) formed at edges of the sheet members as margins for joining with other sheet members, but are not limited to flanges. The overlaid parts of the flanges and shaped parts (parts other than flanges) may be joined by non-melting joining means.

The number of the overlaid sheet members is usually two to three; however, a greater number may also be overlaid. Further, while no limit need be set for the thicknesses of the sheet members, if from a practical viewpoint, in metal sheet members, the lower limit can be made 0.5 mm and the upper limit is suitably made 2.6 mm. In CFRP, the lower limit can be made 0.3 mm and the upper limit is suitably made 4.0 mm.

Various types of sheet members can be used; however, with steel sheet members, cold press-formed parts or tensile strength 1200 MPa or more hot stamped parts obtained by heating steel sheet for hot stamping use to the austenite temperature or more and shaping it by a water-cooled die while hardening it to raise the strength may be illustrated. Further, it is possible to heat treat a hot stamped part with a tensile strength of 1200 MPa or more to lower the strength of the part for mechanical joining down to about 590 MPa to thereby form a hot stamped part easy for forming through holes in. The steel sheet member overlaid with the steel sheet member used may be a high strength steel sheet or hot stamped part with a tensile strength of 1200 MPa or more or may be a steel sheet with a tensile strength of 270 MPa to 980 MPa. Note that, the steel sheet may be a cold rolled steel sheet or a hot rolled steel sheet.

Further, in the case of a steel sheet, a nonplated steel sheet which is not plated on its surface or a steel sheet covered by a hot dip galvannealed coating (GA coating), hot dip galvanized coating (GI coating), electric galvanization (EG), Zn—Al plating, Zn—Al—Mg plating, or other zinc-based plating and further an aluminum plated steel sheet etc. may be covered. In the case of a hot stamped material, a steel sheet member not plated or covered with aluminum plating or an intermetallic compound of iron and aluminum or a steel sheet member covered with an iron-zinc solid solution layer and zinc oxide layer or a steel sheet member covered with an iron-zinc-nickel solid solution layer and zinc oxide layer may be covered.

In mechanical joining, materials not suitable for welding may also be joined. For example, the invention can be applied to structural members combining a plurality of aluminum materials and structural members combining aluminum materials and steel materials. Furthermore, the invention can be applied to structural members using a CFRP material instead of a metal member. In friction stir spot joining as well, materials not suitable for welding may also be joined. For example, the invention can be applied to structural members combining a plurality of aluminum materials and structural members combining aluminum materials and steel materials.

Non-Melting Joining Means

Figure 6:
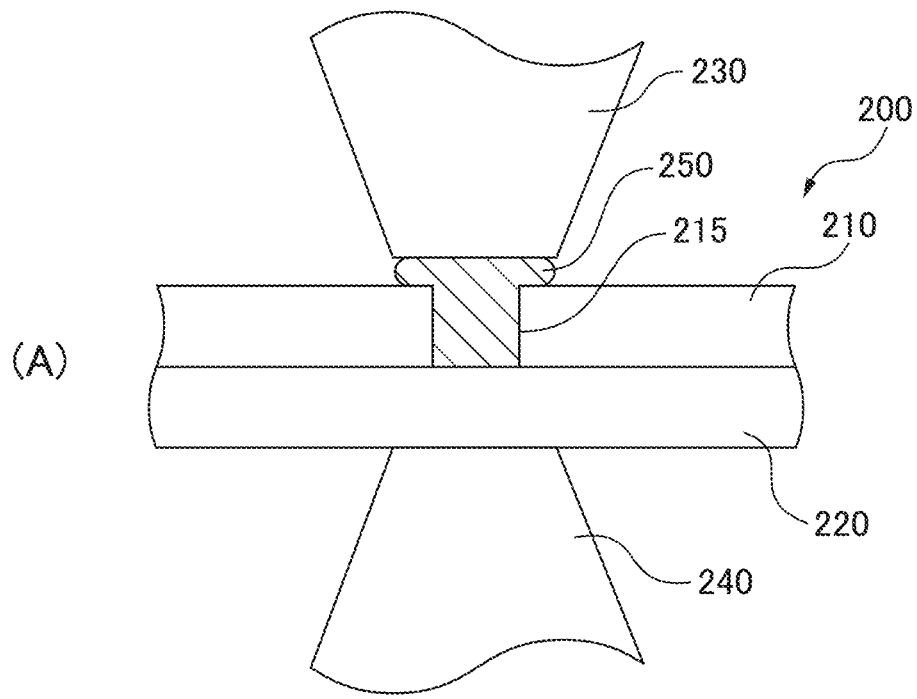
FIGS. 6(A) and 6(B) are views for explaining resistance element welding as one type of mechanical joining means.
Figure 6:
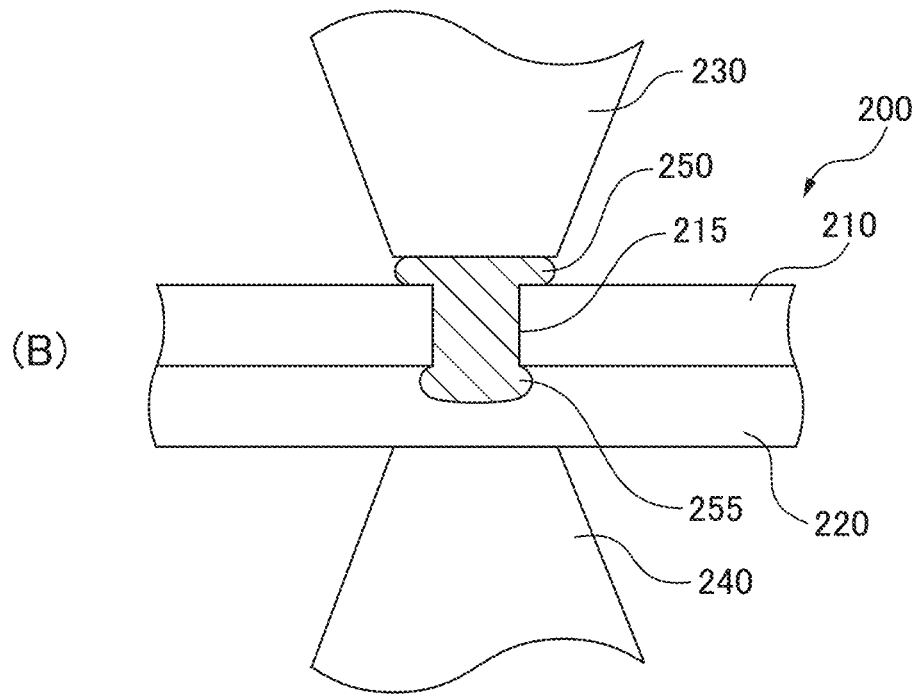

Non-melting joining used for a lap joint of sheet members include mechanical joining and friction stir spot joining. As mechanical joining means, blind rivets, self piercing rivets, hollow rivets, drill screws, bolts, EJOWELD®, FDS®, etc. may be used. In mechanical joining, sometimes like with blind rivets the means pass through all of the overlapping metal sheet members and sometimes like with self piercing rivets the means do not pass through some of the overlapping metal sheet members; however, the present invention can be applied to either case. Further, as the mechanical joining means, resistance element welding (REW) may also be used. This REW, as shown in FIGS. 6(A) and 6(B), is a joining means which overlays a top sheet 210 (for example, aluminum alloy sheet) formed with a hole 215 passing through it in the sheet thickness direction and a bottom sheet 220 (for example, boron steel or other steel sheet) to form a sheet assembly 200, inserts a flanged steel rivet 250 in the hole 215 of the top sheet 210, and uses a top electrode 230 and bottom electrode 240 to grip part of the sheet assembly 200 corresponding to the flanged rivet 250 (see FIG. 6(A)) while running a predetermined current through the sheet assembly 200 and thereby melt the contact parts of front end part of the flanged rivet 250 and the bottom sheet 220 to form a nugget 255 (see FIG. 6(B)). In this way, REW is a joining means which partially utilizes a melt joining means; however, inherently utilizes the mechanical element of a flanged rivet 250, so even such a joining means can be suitably used as a mechanical joining means for the present invention.

As the friction stir spot joining means, the invention can be applied to spot joining using a rotary tool having a probe at its tip. In this case, it is preferably applied to the case where a hole of a depth of 80% or more of the sheet thickness is formed by pressing by the probe. Further, the present invention can also be applied to the case of jointly using joining by a resin by interposing a resin at the overlapping surfaces, for example, a case of jointly using joining by a binder by interposing a binder (for example, an epoxy resin-based binder etc.) at the overlapping surfaces, the case of water-proofing or insulating the seams by interposing a seal-use resin (sealer) at the overlapping surfaces, etc. Jointly using joining by a binder by interposing a structural use binder or impact-resistant type binder at the overlapping surfaces is a preferred embodiment of the present invention. In particular, in the case of a structural member combining an aluminum material and steel material, joint use of a resin or a binder having a sealing function which enables electrical insulation is preferable.

Positions of Joined Parts

Figure 7:
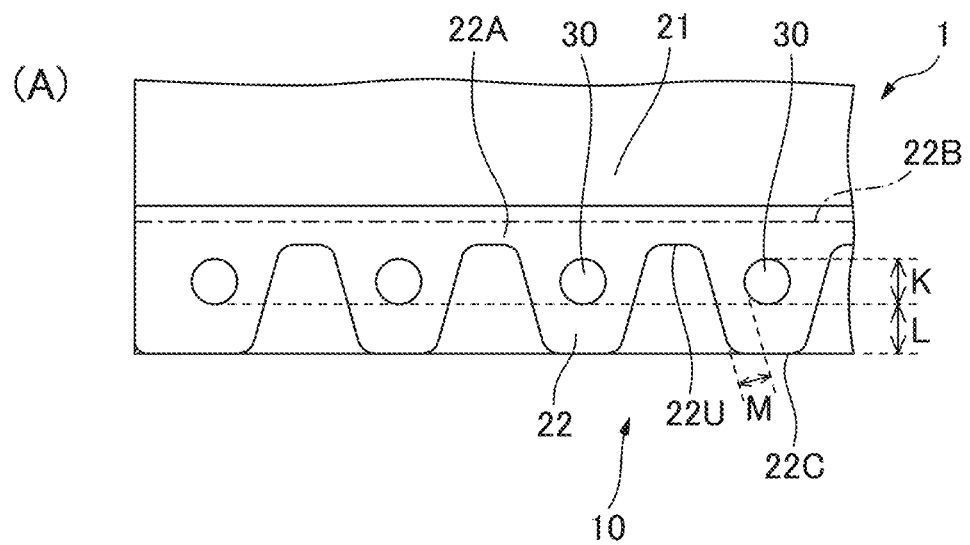
Figure 7:
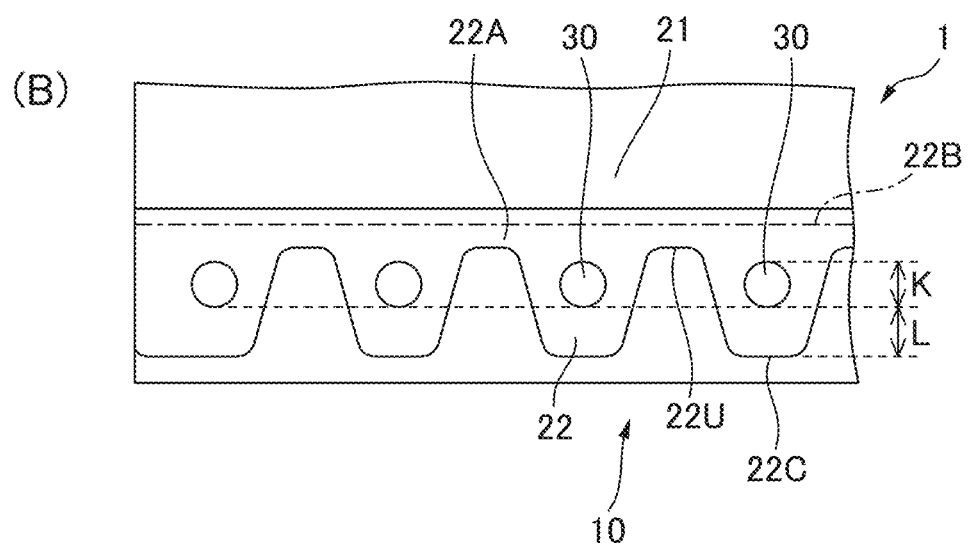

Regarding the positions of the joined parts, if the positions of the holes formed in the joined parts are too close to the end parts of the sheet members, the danger of breakage at the holes becomes higher, so the shortest distance between the end parts of the holes 30 and the end parts 22C of the sheet member at which the cutaway recessed parts 22U are formed, as shown in FIGS. 7(A) and 7(B), is made "L" and the holes are provided at positions where the shortest distance L satisfies the condition of $L \geq 0.8K$ with respect to the inside diameters (circle equivalent diameters) K of the holes. Note that, when, as in the later explained example shown in FIGS. 9 and 10, the cutaway recessed parts are formed at the edges of a plurality of overlapping sheet members, it is preferable to make all of the sheet members at which the cutaway recessed parts are formed satisfy the condition of $L \geq 0.8K$. Further, the shortest distance M between the end part of a hole 30 and an end part of a flange piece 22 (end part of cutaway recessed part 22U) (see FIG. 7(A)) is also preferably 0.8K or more, more preferably 1.5K or more. The pitch of the joined parts (distance between adjacent joined parts) is usually 20 mm to 100 mm or so; however, the invention is not limited to this. The pitch may be suitably set in accordance with the structure covered or its location. Note that, in the present invention, the holes formed at joined parts may be blind holes which do not pass through the sheet members where the holes are formed or may be through holes which pass through at least one sheet member.

Cutaway Recessed Parts

Basic Form of Cutaway Recessed Parts

The cutaway recessed parts 22U are formed in the edge parts of the flange parts forming the overlapping parts. For example, in a hat-shaped member, the cutaway recessed parts 22U are formed passing through the flange parts in the thickness direction and extending from the end parts of the flange parts to parts of the regions positioned between adjacent joined parts SP formed by mechanical joining means in the flange width direction or to near the bending starting points of the hat-shaped member (the bending starting points 22B shown by the one-dot chain line parts in FIG. 2 etc.) (corners R of transition to bent parts 22R). Further, connecting parts 22A are formed between the cutaway recessed parts 22U and the bent parts of the hat-shaped member.

A cutaway recessed part, as shown in the example of FIGS. 1 and 2, is formed between each two adjacent joined parts. When providing a large number of joined parts (when the distance between joined parts is narrow) etc., as shown in the example of FIG. 8, locations where the cutaway recessed parts are not formed can be provided (i.e., two or more joined parts are provided between cutaway recessed parts adjacent in the longitudinal direction).

Figure 8:
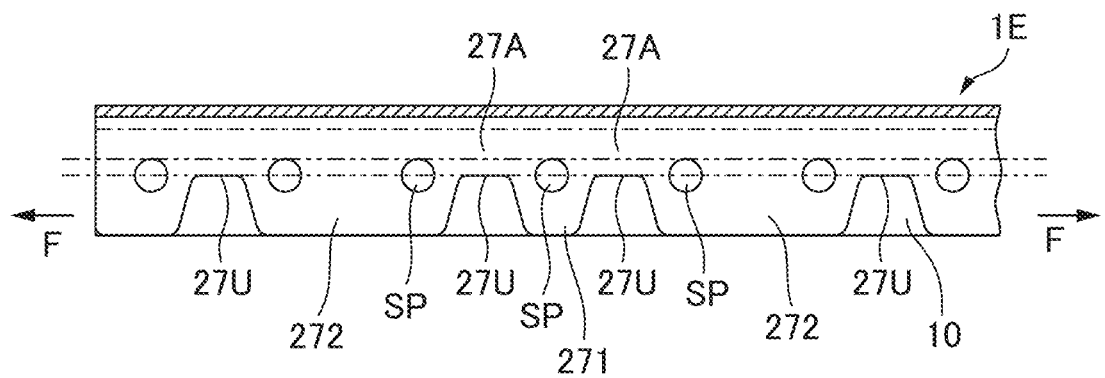
FIG. 8 is a view for explaining another form of cutaway recessed parts provided at the overlapping parts of the sheet members.

In the example of FIG. 8, pluralities of the flange pieces 271 and the flange pieces 272 are alternately formed along the longitudinal direction of the lap joint member 1E. The cutaway recessed parts 27U are formed between the adjacently arranged flange pieces 271 and flange pieces 272. The flange pieces 271 are formed with the cutaway recessed parts 27U at the both sides in the longitudinal direction and are made sizes enabling formation of single joined parts SP. The flange pieces 272 are formed with the cutaway recessed parts 27U at the both sides in the longitudinal direction and are made sizes enabling formation of two (plurality of) joined parts SP.

Locations of Formation of Cutaway Recessed Parts

Figure 9:
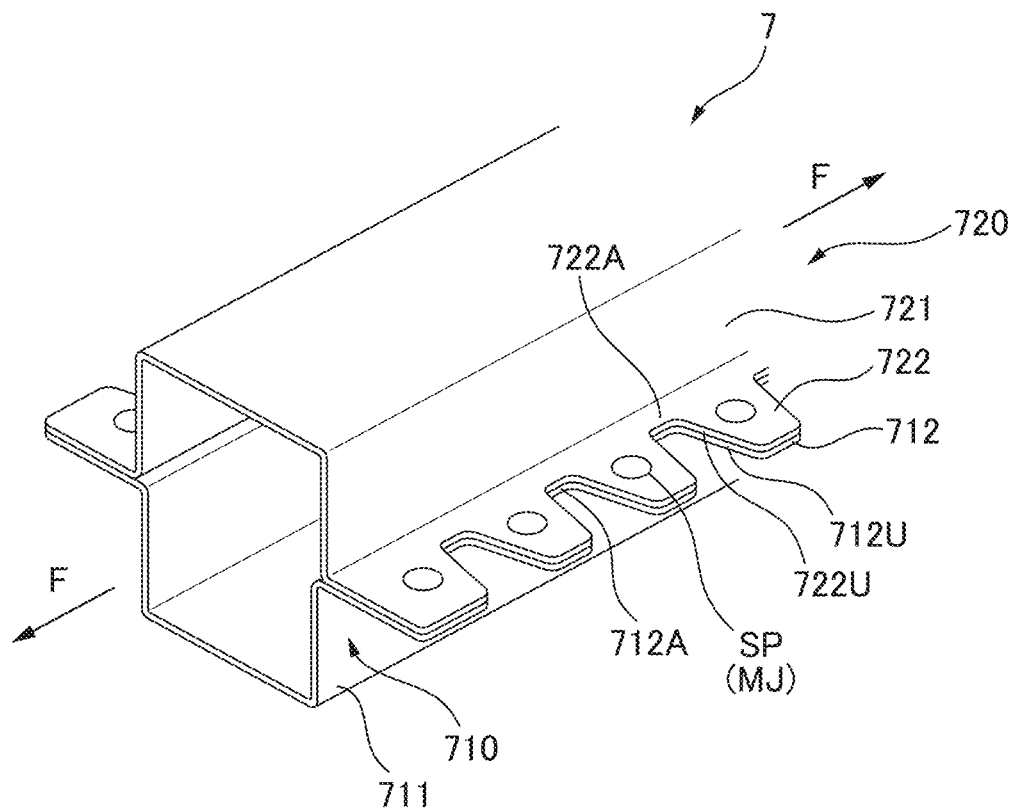
FIG. 9 is a view for explaining another form of cutaway recessed parts provided at the overlapping parts of the sheet members.
Figure 10:
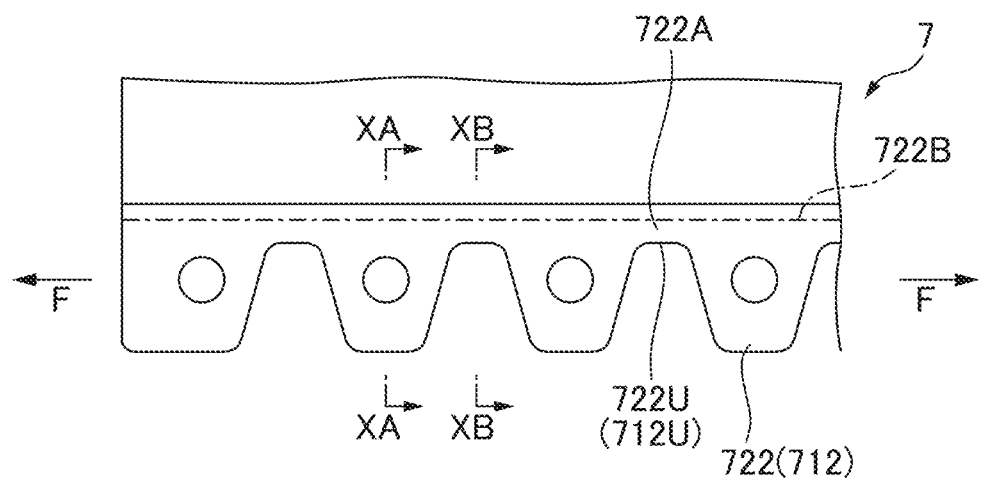
FIG. 10 is a view of the lap joint member 7 according to the form shown in FIG. 9 seen from the sheet thickness direction for explaining the general configuration.

Further, the cutaway recessed parts are formed at least at one sheet member among the overlaid sheet members. As shown in the example of FIGS. 9 and 10, they may be provided at all of the sheet members of the overlapping parts. In a three-layer member, the cutaway recessed parts may be formed at one sheet member or two sheet members or may be formed at three sheet members. In the case of self piercing rivets, it is also possible to form the cutaway recessed parts at all of the overlaid sheet members including the sheet members at which through holes are not formed, to form the cutaway recessed parts at only the sheet members at which through holes are formed at the time of joining, or form the cutaway recessed parts at only the sheet members with high values of tensile strength×sheet thickness among the sheet member at which through holes are formed. Note that, from the viewpoint of the advantageous effect of the present invention being reliably obtained, the cutaway recessed parts are preferably formed at least at the sheet members at which the holes are formed.

In FIGS. 9 and 10, the lap joint member 7 is provided with a first hat-shaped member (sheet member) 710, second hat-shaped member (sheet member) 720, and joined parts SP formed by mechanical joining means (joined parts). The overlapping parts of the flange parts of the first hat-shaped member 710 and the flange parts of the second hat-shaped member 720 are joined by mechanical joining means MJ.

At the flange parts of the first hat-shaped member 710, the flange pieces 712 and the connecting parts 712A connecting the adjacently arranged flange pieces 712 are provided. The cutaway recessed parts 712U are formed between the adjacent flange pieces 712 and flange pieces 712. Further, at the flange parts of the second hat-shaped member 720 as well, in the same way, connecting parts 722A and cutaway recessed parts 722U between the adjacent flange pieces 722 and flange pieces 722 are formed. Further, at the overlapping parts, the cutaway recessed parts 712U and the cutaway recessed parts 722U are formed superposed.

Figure 11:
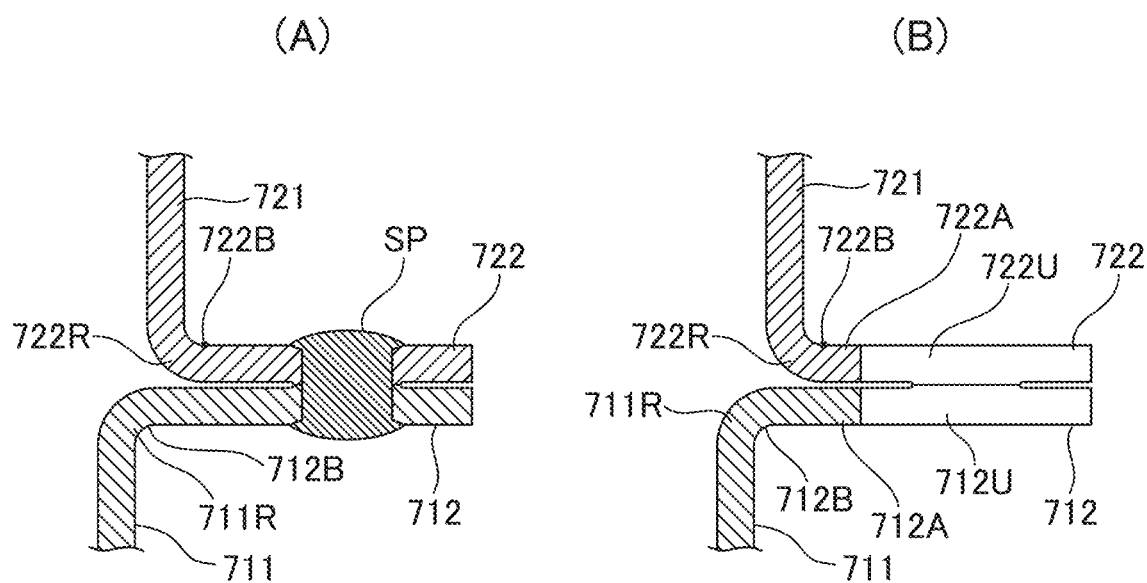

Note that, in this example, the upright wall parts 711 of first hat-shaped member 710 and the upright wall parts 721 of the second hat-shaped member 720 are arranged offset, as shown in FIGS. 11(A) and 11(B), so that the upright wall parts 711 are positioned at the inside from the upright wall parts 721. Further, the cutaway recessed parts 712U are set so that connecting parts 712A of the flange parts are formed at the upright wall part 711 sides from the flange parts of the first hat-shaped member 710 in a range not reaching the bending starting points 712B of the corners R transitioning to the bending parts 711R. Further, the cutaway recessed parts 722U are similarly set so that connecting parts 722A of the flange parts are formed at the upright wall part 721 sides from the flange parts of the second hat-shaped member 720 in a range not reaching the bending starting points 722B of the corners R transitioning to the bending parts 722R.

The bending starting points 722B are arranged outside from the bending starting points 712B in the width direction of the flange parts. In FIG. 10, they are formed at the positions shown by the one-dot chain lines. Further, the cutaway recessed parts 712U are formed in ranges outside from the flange parts in the width direction compared with the bending starting points 712B.

Shape of Cutaway Recessed Parts

Figure 12:
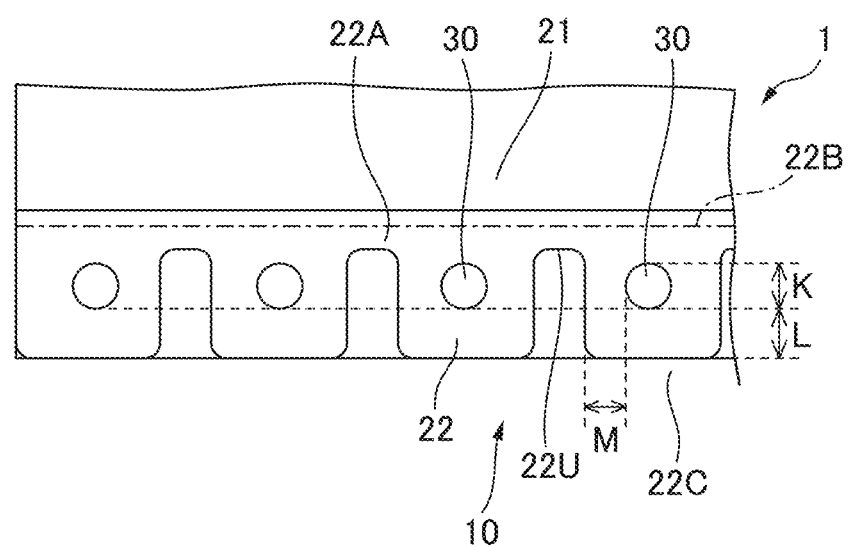
FIG. 12 is a view for explaining another form of cutaway recessed parts provided at the overlapping parts of the sheet members.

The cutaway recessed parts, in FIG. 1, are formed into trapezoidal shapes long at the open sides of the end parts of the sheet member at the overlapping parts and short at the bottom part sides at the insides of the sheet member; however, the present invention is not limited to such shapes. The cutaway recessed parts may also be formed into upside down trapezoidal shapes short at the open sides of the end parts of the sheet member at the overlapping parts and long at the bottom part sides at the insides of the sheet member. Further, they may be formed into U-shapes (rectangular shapes) with parallel sides such as shown in FIG. 12. The corners of the cutaway recessed parts are preferably formed by curves. Further, the inside bottom parts of the cutaway recessed parts preferably have parallel parts in the parallel direction to the end parts 22C of the overlapping parts. The lengths of the parallel parts can be set to lengths of 0.5 time K or more where K is the inside diameter of the holes of the joined parts. Preferably they are 1 time K or more, more preferably 2 times K or more, still more preferably 3 times it or more, more optimally 4 times it or more.

Depth of Formation of Cutaway Recessed Parts

The positions of the inside bottom parts of the cutaway recessed parts 22U (depths of recessed parts) may be suitably set in accordance with the structures of the sheet members applied to or the estimated load stress etc.; however, the parts must be formed at the opposite sides (insides) from the end parts at least K or more from the outside end parts 22C of the overlapping parts where K is the inside diameters of the holes. More preferably, they are formed at 1.2K or more, still more preferably 1.5K or more where the bottom parts become the inside from the end parts of the holes.

Further, the maximum depth may be made a depth up to the bending starting point of the flanges (bending starting point 22B shown by one-dot chain line) when at least one of the overlapping parts is a flange. When the cutaway recessed parts are, for example, formed sunken into the flange width of the sheet member up to a range of ½ or more of the same, it can be expected that in the regions between the joined parts, tensile stress is dispersed in ½ or more of the width from the end part side and the tensile stress transmitted between the joined parts becomes ½ or less. Further, the connected regions where the cutaway recessed parts are not formed (connecting parts 22A) provide resistance to the dispersed tensile stress. When the cutaway recessed parts are formed including all of the width directions of the flanges, tensile stress no longer acts between the joined parts. When the overlapping parts are not flange parts or when the width of the lap joint member as a whole is narrow, the depth of formation of the cutaway recessed parts has to be determined considering the effects of the provision of the cutaway recessed parts on the strength of the lap joint member as a whole.

Figure 13:
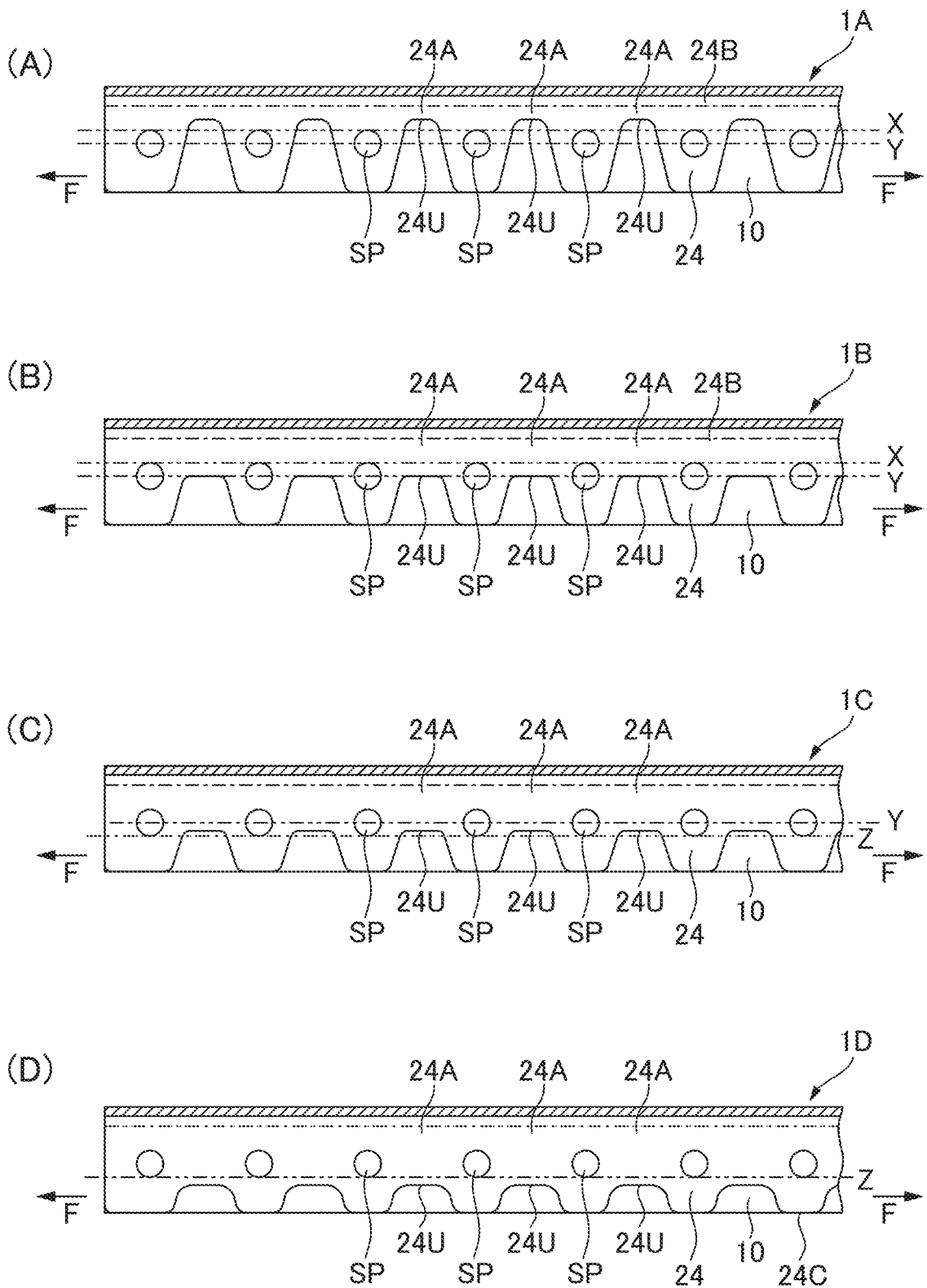
FIGS. 13(A) to 13(D) are views for explaining the form of cutaway recessed parts provided at the overlapping parts of the sheet members.

Examples of the depth of formation of the cutaway recessed parts are shown in FIGS. 13(A) to 13(D). FIG. 13(A) shows a lap joint member 1A in the case where the inside bottom parts of the cutaway recessed parts 24U are positioned at depths beyond the line X connecting the inside end parts of the holes formed in the joined parts SP, while FIG. 13(B) shows a lap joint member 1B in the case where the inside bottom parts are positioned at depths matching the line Y connecting the centers of the holes formed in the joined parts SP. FIG. 13(C) shows a lap joint member 1C in the case where the inside bottom parts of the cutaway recessed parts 24U are positioned between the line Y and the line Z connecting the outside end parts of the holes formed in the joined parts SP, while FIG. 13(D) shows a lap joint member 1D in the case where the width of the lap joint member as a whole (width of member in direction perpendicular to the direction in which tensile stress is generated (arrow mark F)) is not sufficient and the inside bottom parts are positioned closer to the flange end parts 24C than the line Z.

In the examples of FIGS. 13(A) to 13(D), cases where the depths of adjacent cutaway recessed parts were all the same were shown; however, the adjacent cutaway recessed parts may also be formed to be different in depth. Examples where the cutaway recessed parts differ in depth are shown in FIGS. 14(A) to 14(C).

Figure 14:
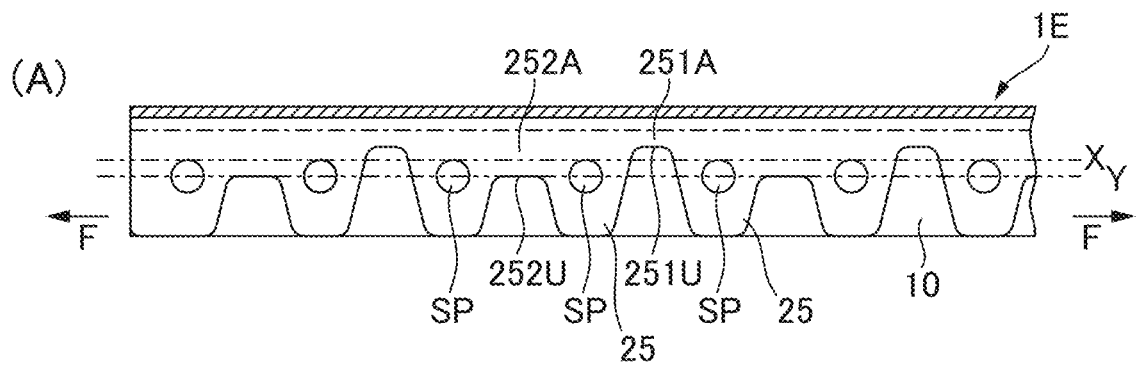
FIGS. 14(A) to 14(C) are views for explaining another form of cutaway recessed parts provided at the overlapping parts of the sheet members.
Figure 14:
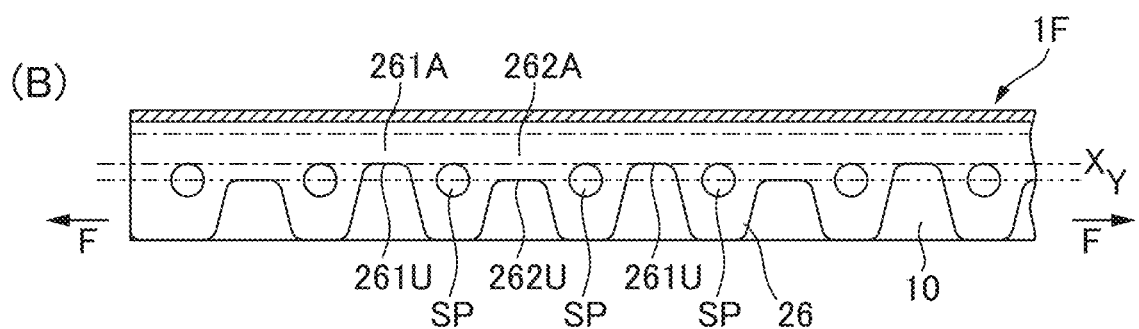
Figure 14:
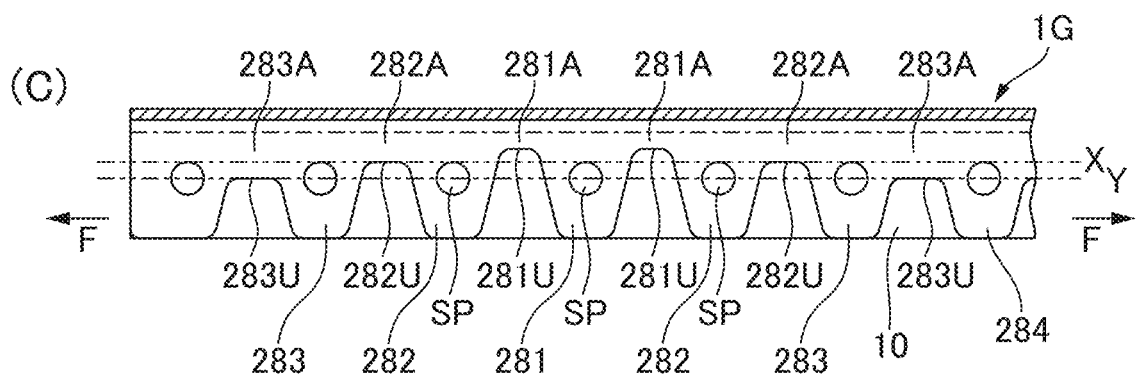

FIG. 14(A) shows a lap joint member 1E in the case where the cutaway recessed parts of FIG. 13(A) and the cutaway recessed parts of FIG. 13(B) are mixed. That is, a plurality of flange pieces 25 are formed along the longitudinal direction of the lap joint member 1E and cutaway recessed parts 251U corresponding to FIG. 13(A) and cutaway recessed parts 252U corresponding to FIG. 13(B) are alternately formed between the adjacently arranged flange pieces 25 and flange pieces 25.

FIG. 14(B) shows a lap joint member 1F in the case where cutaway recessed parts of depths intermediate between the cutaway recessed parts of FIGS. 13(A) and 13(B) and cutaway recessed part of FIG. 13(B) are mixed. That is, a plurality of flange pieces 26 are formed along the longitudinal direction of the lap joint member 1F and cutaway recessed parts 261U of depths matching the line X and cutaway recessed parts 262U corresponding to FIG. 13(B) are alternately formed between the adjacently arranged flange pieces 26 and flange pieces 26.

FIG. 14(C) shows a lap joint member 1G in the case of combining FIGS. 14(A) and 14(B). That is, a plurality of flange pieces are formed along the longitudinal direction of the lap joint member 1G, cutaway recessed parts 281U corresponding to the above FIG. 13(A) are formed between the adjacently arranged flange pieces 281 and flange pieces 282, cutaway recessed parts 282U of depths matching the line X are formed between the adjacently arranged flange pieces 282 and flange pieces 283, and cutaway recessed parts 283U corresponding to FIG. 13(B) are formed between the flange pieces 283 and flange pieces 284.

Application to Car Body Structure

Below, referring to FIG. 15 to FIG. 18, examples of application of the lap joint structure of the present invention explained above (comprised of a plurality of metal sheet members) to important members (auto parts) protecting the passengers inside the cabin when side collision occurs at a monocoque forming a car body will be explained.

First Example of Application

This example is an example of application of the lap joint structure of the present invention to a B-pillar 3 of an automobile car body structure. FIG. 15(A) is a perspective view showing the B-pillar and FIG. 15(B) is a view enlarging the range shown by the two-dot chain line B in FIG. 15(A). Note that, in FIG. 15(B), illustration of the outer panel arranged at the outside is omitted.

The B-pillar (lap joint member) 3, as shown in FIG. 15(A), is for example provided with an inner reinforcement (first structural member) 310 extending in the height direction of the car body and an outer reinforcement having a substantially hat-shaped cross-section (second structural member) 320. At the outside of it, an outer panel (not shown) is provided. Further, at a flange part 311 of the inner reinforcement 310, the outer reinforcement 320 and outer panel are for example connected over the three layers at the joined parts SP by self piercing rivets or other mechanical joining means. Further, at the overlapping surfaces of the outer panel and outer reinforcement and the joints of the outer reinforcement and inner reinforcement, a binder may be jointly used for dispersing the strain. In particular, when the outer panel is aluminum, joint use of a binder is preferable. The outer reinforcement 320, as shown in FIG. 15(B), is provided with a plurality of flange pieces 322 and connecting parts 322A connecting adjacent flange pieces 322. Cutaway recessed parts 322U are formed between adjacent flange pieces 322. The inside bottom parts of the cutaway recessed parts 322U are formed up to positions inside from the joined parts SP.

Figure 15:
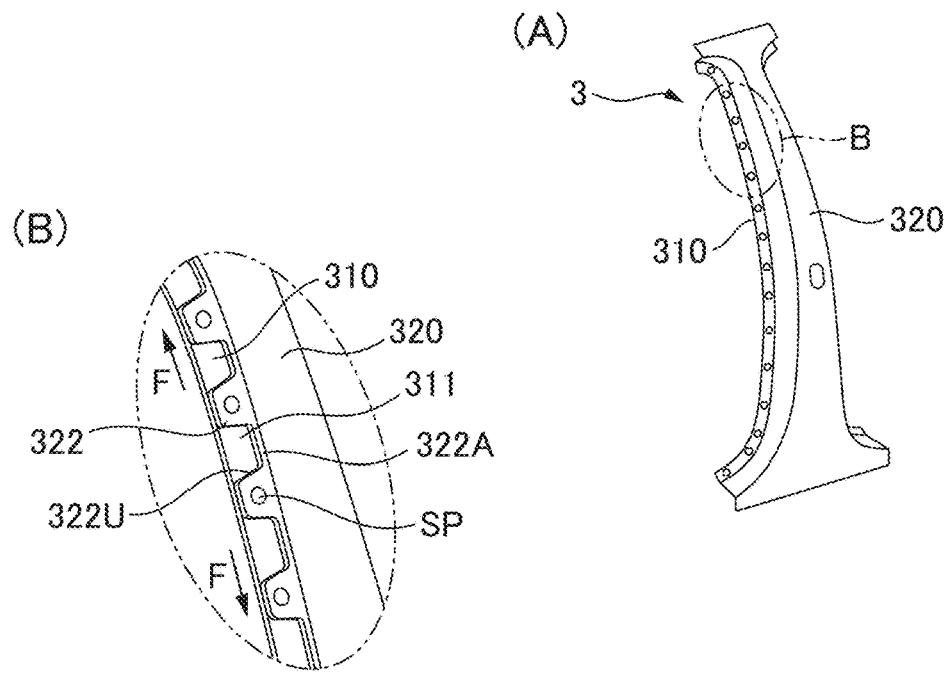
Figure 16:
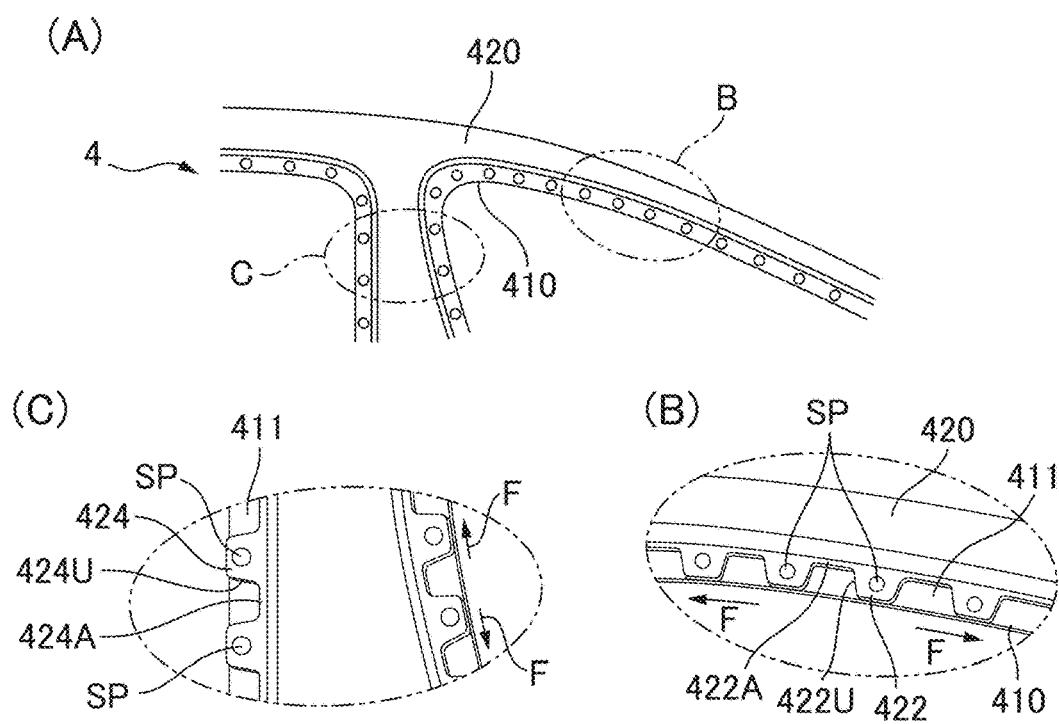
Figure 17:
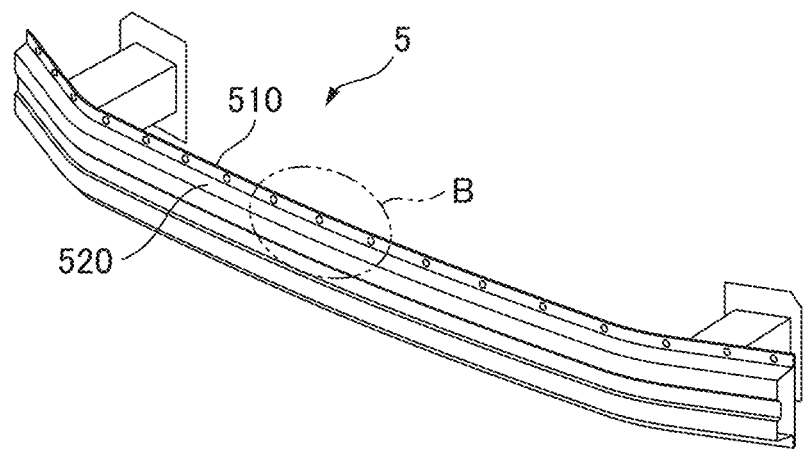
Figure 17:
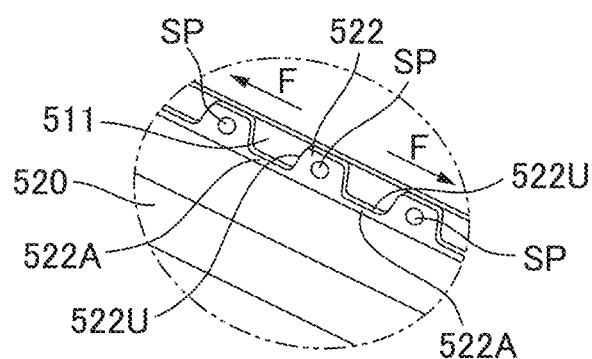
Figure 18:
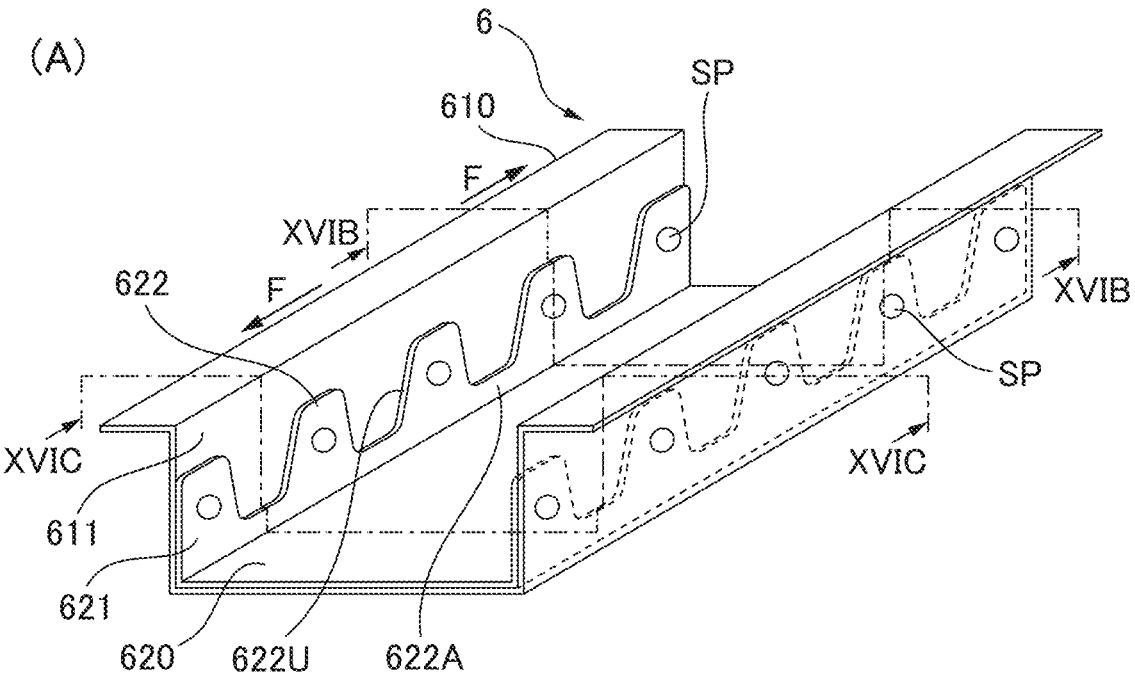
Figure 18:
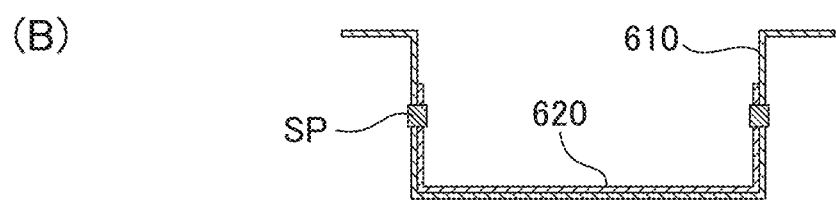
Figure 18:
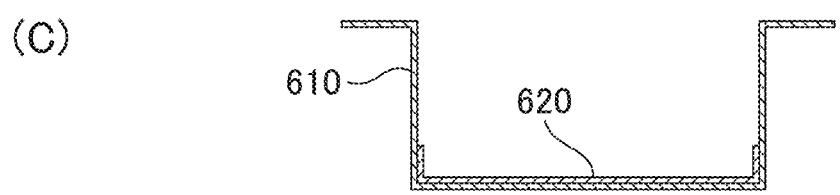

Further, one or both of the inner reinforcement 310 and outer reinforcement 320 is made for example a steel sheet member obtained by cold press-forming a high strength steel sheet (for example, high strength steel sheet with a tensile strength of 590 MPa or more) or a hot stamped material formed with a martensite structure by shaping steel sheet for hot stamping use by hot stamping (for example, steel sheet member with a tensile strength of 1200 MPa or more). Further, the outer panel provided at the outside of the outer reinforcement is similarly a member shaped from a steel sheet or aluminum sheet. Note that, the arrow mark F in FIG. 15 shows the direction of the tensile stress (estimated tensile stress) generated when the B-pillar 3 receives outside force due to a collision etc. If the automobile structural member (auto part) is a member which receives outside force in a direction bending due to collision, the stress caused by the collision acts on the automobile structural member (auto part) in a direction connecting the inside and outside of the cabin. The tensile stress is generated in a direction along generally the longitudinal direction.

Second Example of Application

This example is an example of application of the lap joint structure of the present invention to an automobile structural member (auto part) including a roof rail 4. FIG. 16(A) is a perspective view showing the roof rail 4, FIG. 16(B) is a view enlarging the range shown by the two-dot chain line B in FIG. 16(A) as seen through the outer panel, and FIG. 16(C) is a view enlarging the range shown by the two-dot chain line C in FIG. 16(A).

The roof rail (lap joint member) 4, as shown in FIG. 16(A), for example extends along the length direction of the car body and is connected to the A-pillar while extends in the height direction from the center in the length direction and is connected to a B-pillar. The roof rail (lap joint member) 4 is provided with an inner reinforcement (first structural member) 410, an outer reinforcement (second structural member) 420 having a substantially hat-shaped cross-section, and an outside outer panel (not shown). Further, at the flange part 411 of the inner reinforcement 410, the outer reinforcement 420 and the outer panel are for example connected by joined parts SP formed by mechanical joining means. Further, a binder may be jointly used at the overlaid surfaces of the outer panel and outer reinforcement and for joining the outer reinforcement and inner reinforcement. In particular, when the outer panel is aluminum, joint use of a binder is preferable.

The outer reinforcement 420, as shown in FIGS. 16(B) and 16(C), is provided with a plurality of flange pieces 422 formed along the roof rail 4, connecting parts 422A connecting adjacent flange pieces 422, a plurality of flange pieces 424 formed along the B-pillar, and connecting parts 424A connecting adjacent flange pieces 424. The cutaway recessed parts 422U are formed between the adjacent flange pieces 422, while the cutaway recessed parts 424U are formed between the adjacent flange pieces 424.

Further, one or both of the inner reinforcement 410 and the outer reinforcement 420 is made a steel sheet member or a hot stamped material similar to the first example of application. Further, the outer panel is a member formed by a steel sheet or aluminum sheet. Note that, the arrow mark F in FIG. 16(B) shows the direction of the tensile stress (estimated tensile stress) generated when the roof rail 4 receives outside force due to a side collision etc., while the arrow mark F in FIG. 16(C) shows the direction of the tensile stress (estimated tensile stress) generated when the B-pillar receives outside force due to a collision etc.

Third Example of Application

This example is an example of application of the lap joint structure of the present invention to a bumper (automobile structural member, auto part) 5. FIG. 17(A) is a perspective view showing the bumper, while FIG. 17(B) is a view enlarging the range shown by the two-dot chain line B in FIG. 17(B).

The bumper (lap joint member) 5, as shown in FIG. 17(A), is for example formed extending along the width direction of the car body and is provided with a bumper inner reinforcement (first structural member) 510 and bumper outer reinforcement (second structural member) 520 having a hat shaped cross-section at which the cutaway recessed parts are formed. Further, at the flange 511 of the bumper inner reinforcement 510, the bumper outer reinforcement 520 is connected by joined parts SP by for example mechanical joining means.

The bumper outer reinforcement 520, as shown in FIG. 17(B), is provided with a plurality of flange pieces 522 formed along the flange 511 of the bumper inner reinforcement 510 and connecting parts 522A connecting adjacent flange pieces 522. The cutaway recessed parts 522U are formed between the adjacent flange pieces 522.

One or both of the bumper inner reinforcement 510 and the bumper outer reinforcement 520 is made a steel sheet member or a hot stamped material similar to the first example of application. Note that, the arrow mark F in FIG. 17(B) shows the direction of tensile stress (estimated tensile stress) generated when the bumper 5 receives outside force due to collision etc.

Fourth Example of Application

This example shows an example of application of the lap joint structure of the present invention to the B-pillar outer reinforcement 6 of an automobile. FIG. 18(A) is a perspective view showing a B-pillar outer reinforcement, FIG. 18(B) is a cross-sectional view along the arrow XVIB-XVIB in FIG. 18(A), and FIG. 18(C) is a similar cross-sectional view along the arrow XVIC-XVIC.

At the inside of the B-pillar outer reinforcement 610 having the hat-shaped cross-section, a reinforcing member 620 having a channel shaped cross-section is placed. The two wall surfaces are for example connected by joined parts SP by mechanical joining means. The end parts of the side walls 621 of the reinforcing member 620 are positioned at the middle of the rising walls 611 of the B-pillar outer reinforcement 610. At the side walls 621 of the reinforcing member 620, the cutaway recessed parts 622U are provided. A plurality of side wall pieces 622 and connecting parts 622A connecting adjacent side wall pieces 622 are provided. Between the adjacent side wall pieces 622, the cutaway recessed parts 622U are formed.

One or both of the B-pillar outer reinforcement 610 and reinforcing member 620 is made a steel sheet material or a hot stamped material similar to the first example of application. Note that, the arrow mark F in FIG. 18(A) shows the direction of the tensile stress (estimated tensile stress) generated when the B-pillar receives outside force due to collision etc.

By applying the lap joint structure of the present invention to structural members for an automobile (auto part) installed around a cabin such as shown in FIG. 15 to FIG. 18, these structural members can be kept from breaking due to holes in the joined parts SP due to the mechanical joining means and the safety with respect to side collisions can be raised.

Note that, this invention is not limited to the above embodiment. Various changes can be made within a range not deviating from the gist of the invention. For example, in the above embodiment, the case of application of the present invention to an auto part was explained; however, for example it may also be applied to various lap joint members joining overlapping parts by mechanical joining means in joinery for building use, beams, link members or simple storage sheds, furniture, appliances, etc.

Further, for example, in the above embodiment, mainly the case of use with high strength steel sheet with a tensile strength of 590 MPa or more was explained; however, for example the invention can also be applied to steel sheet with a tensile strength of less than 590 MPa. Furthermore, the invention can be similarly applied to a member joining aluminum materials with each other and a member joining an aluminum member and iron material.

In the above embodiment, the case of forming a lap joint structure by forming joined parts at the overlapping parts of two or three overlapping sheet members was explained; however, the invention may also be applied to a lap joint structure comprised of four or more overlapping sheet members.

Further, in the above embodiment, the case of forming the cutaway recessed parts at one sheet member or two sheet members among the two or three sheet members was explained; however, for example it is also possible to form joined parts at an overlapping part of four or more (a plurality of) overlapping sheet members to obtain a lap joint structure. In such a case, several sheet members formed with cutaway recessed parts may be provided or freely set.

Further, in the lap joint structure of the present invention, when forming joined parts at overlapping parts at which three or more (a plurality of) sheet members are overlaid to form a lap joint structure (for example, when forming joined parts at overlapping parts at which three sheet members are overlaid to form a lap joint structure), it is possible to form the cutaway recessed parts at the single sheet member at the center side in the sheet thickness direction or not form the cutaway recessed parts at the single sheet member at the center side, but form the cutaway recessed parts at the sheet members at the both sides (outsides) in the sheet thickness direction. Further, the lap joint structure of the present invention needless to say may also be applied to the case of four or more sheet members.

Further, in the present invention, needless to say, the case is also included where flange parts are not used for overlapping parts formed by overlapping sheet members but sheet members are joined while overlapping without relying on flanges or are joined to shapes formed with flanges by press forming etc., for the purpose of partial reinforcement etc.

Example 1

Figure 19:
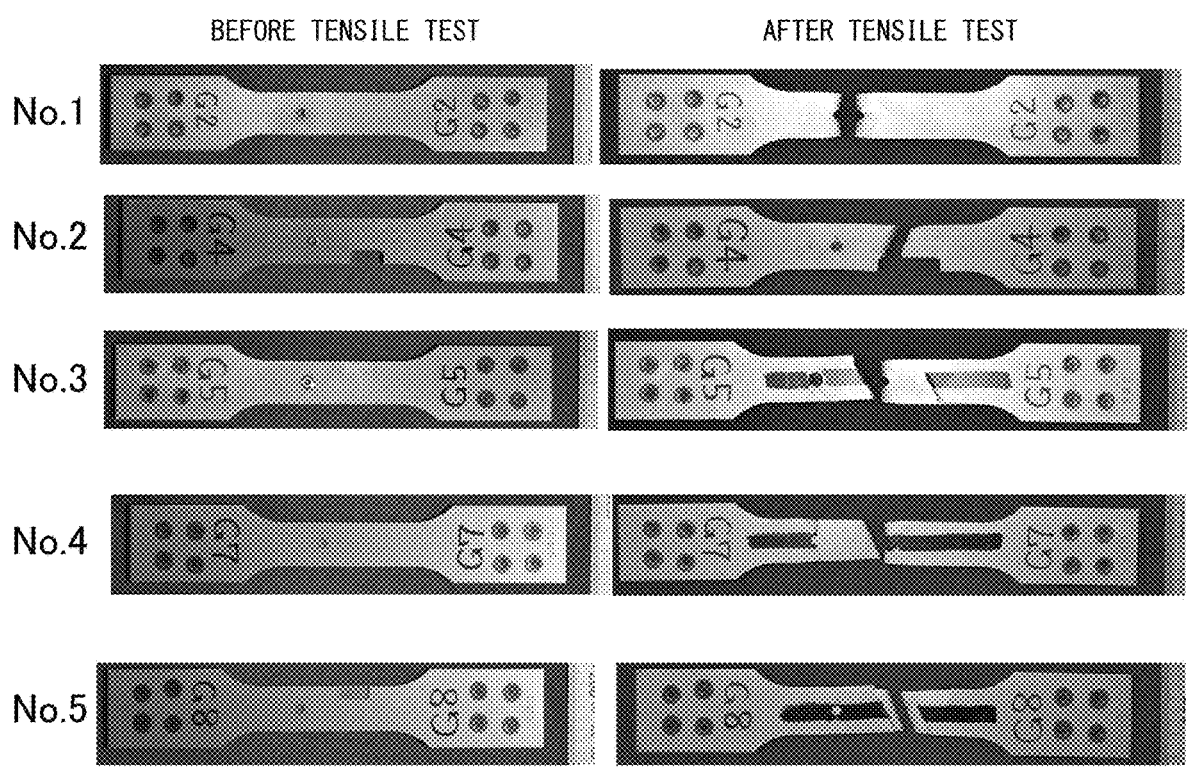
FIG. 19 gives photos showing the states of test pieces before and after the tensile tests in the examples.

The tensile test pieces before the tensile tests shown in Test Nos. 1 to 5 of FIG. 19 were prepared. For each tensile test piece, a sheet A comprised of a steel sheet with a tensile strength of 980 MPa and with a narrowed center part and a sheet B comprised of a steel sheet with a tensile strength of 590 MPa and with a shape the same as the sheet A were used.

Test Nos. 1 to 3 are examples of joining sheets using blind rivets. Test No. 1 is an example of joining a sheet A and a sheet B while overlaid without providing cutaway recessed parts, Test No. 2 is an example of joining sheets while providing cutaway recessed parts at the same positions of the both sheets, and Test No. 3 is an example of joining sheets while providing cutaway recessed parts at only the sheet A comprised of the high strength steel sheet (upper side steel sheet). Test Nos. 4 and 5 are examples of simulating the state of using self piercing rivets (SPR) to join a sheet A and sheet B and forming holes in only one steel sheet. Test No. 4 is an example of not providing the cutaway recessed parts, while Test No. 5 is an example of providing the cutaway recessed parts at the upper side sheet A where the holes are formed. The state of the test pieces before the tensile test is shown in FIG. 19. Table 1 summarizes the test conditions. Note that, the diameter of a hole formed by a rivet is 4 mm while the shortest distance from the end part of a hole to the end part of the test piece was 8 mm.

Next, each test piece was placed in a tensile test machine and measured for strain until breaking (breaking strain (%)). In the tensile test, the distance between evaluation points was made 50 mm and the tensile speed was made a constant 3 mm/min. The states of breakage of test pieces are shown in FIG. 4. Table 1 shows the test results. In the invention examples provided with cutaway recessed parts, the test pieces broke starting near the edges of the cutaway recessed parts, while in the comparative examples of test pieces not provided with cutaway recessed parts, the test pieces broke starting at the end edges of the holes. In the results obtained, the breaking strain of the invention examples was greatly improved compared with the comparative examples.

TABLE 1

| | Sheet A | | | Sheet B | | | | |
|---|---|---|---|---|---|---|---|---|
| No. | Steel material | Inside diameter of hole | Cutaway recessed part | Steel material | Inside diameter of hole | Cutaway recessed part | Breaking strain (%) | Remarks |
| 1 | Steel sheet Strength: 980 MPa Thickness: 1.2 mm | 4 mm | None | Steel sheet Strength: 590 MPa Thickness: 1.2 mm | 4 mm | None | 2.2 | Comparative example Blind rivet |
| 2 | | | Depth: 6 mm Length: 15 mm (Parallel part: 11 mm) | | | Depth: 6 mm Length: 15 mm | 4.5 | Invention example Blind rivet |
| 3 | | | | | | None | 3.1 | Invention example (recessed part at high strength material side) Blind rivet |
| 4 | | | None | | | None | 2.1 | Comparative example SPR simulation |
| 5 | | | Depth: 6 mm Length: 15 mm (Parallel part: 11 mm) | | | | 4.6 | Invention example SPR simulation |

Example 2

For use as tensile test pieces, in the same way as Example 1, a sheet C comprised of a steel sheet with a tensile strength of 980 MPa while having cutaway recessed parts in part and a sheet D using an Al sheet with a strength of 275 MPa or a steel sheet of 590 MPa were prepared. The sheet C and the sheet D were overlaid in the combinations shown in Table 2 to prepare the tensile test pieces. Test Nos. 6 and 7, like Example 1, are examples of joining sheets in a form simulating self piercing rivets (SPR) while Test Nos. 8 and 9 are examples joining the sheet C and sheet D by friction stir spot joining. The test pieces were subjected to tensile tests in the same way as Example 1. The results are shown in Table 2. Results similar to Example 1 were obtained corresponding to the formation of the cutaway recessed parts in the test pieces.

22B, 24B, 722B bending starting points of flange ends at upright wall part sides
22C, 24C end parts of outer sides of flanges (end parts of overlapping parts)
30 holes in which mechanical joining means are inserted
310 inner reinforcement (first structural member)
320 outer reinforcement (second structural member)
322, 422, 424, 522, 622 flange pieces, side wall pieces
322A, 422A, 424A, 522A, 622A connecting parts
322U, 422U, 424U, 522U, 622U cutaway recessed parts
410 inner reinforcement (first structural member)
420 outer reinforcement (second structural member)
510 bumper inner reinforcement
520 bumper outer reinforcement
610 B-pillar outer reinforcement
620 reinforcing member

TABLE 2

| | Sheet C | | | Sheet D | | | | |
|---|---|---|---|---|---|---|---|---|
| No. | Metal material | Inside diameter of hole | Cutaway recessed part | Metal material | Inside diameter of hole | Cutaway recessed part | Breaking strain (%) | Remarks |
| 6 | Steel sheet Strength: 980 MPa Thickness: 1.2 mm | 5 mm | None | 6000-series Al sheet Strength: 275 MPa Thickness: 1.1 mm | None | None | 2.0 | Comparative example SPR simulation |
| 7 | | 5 mm | Depth: 6 mm Length: 15 mm (Parallel part: 11 mm) | | | None | 4.6 | Invention example SPR simulation |
| 8 | | 3 mm | None | Steel sheet Strength: 590 MPa Thickness: 1.2 mm | | None | 2.2 | Comparative example Friction stir spot joining |
| 9 | | | Depth: 4 mm Length: 15 mm (Parallel part: 11 mm) | | | None | 4.6 | Invention example Friction stir spot joining |

INDUSTRIAL APPLICABILITY

According to the lap joint structure according to the present invention, it is possible to keep a joined part of overlapping parts formed by non-melting joining means from fracturing starting from the holes of the joined part, so industrial utilization is possible.

REFERENCE SIGNS LIST

SP joined part obtained by non-melting joining means (joined part)
MJ mechanical joining means
1, 7 lap joint member
3 B-pillar (lap joint member, auto part)
4 roof rail (lap joint member, auto part)
5 bumper (lap joint member, auto part)
6 B-pillar outer reinforcement (lap joint member, auto part)
10 sheet-shaped member (sheet member)
11 flange part of sheet-shaped member
20, 710, 720 hat-shaped member, first hat-shaped member, second hat-shaped member
21, 711, 721 upright wall parts
22, 24, 25, 26, 271, 272, 281, 282, 283, 284, 712, 722 flange pieces (flanges)
22A, 24A, 251A, 252A, 261A, 262A, 27A, 281A, 282A, 283A, 712A, 722A connecting parts
22U, 24U, 251U, 252U, 261U, 262U, 27U, 281U, 282U, 283U, 712U, 722U cutaway recessed parts

The invention claimed is:

1. A lap joint structure comprised of a plurality of sheet members with an overlapping part joined at a plurality of joined parts in a point manner by mechanical joining means or friction stir spot joining means and with the joined parts formed with, at least at one of the sheet members, holes through which the mechanical joining means are inserted or holes formed at a time of spot joining by the friction stir spot joining means, in which lap joint structure,
the overlapping part of at least one of the sheet members among the above sheet members is formed with a cutaway recessed part between adjacent joined parts in a direction from an end part of the overlapping part to the joined parts, and
an inside bottom part of the cutaway recessed part is formed at a position of K or more apart from the end part of the overlapping part, where K is an inside diameter of the hole.

2. The lap joint structure according to claim 1 wherein the hole is positioned so that a distance L between an end part of the hole and an end part of a sheet member at which the cutaway recessed part is formed satisfies the relationship of L≥0.8K with respect to the inside diameter K of the hole.

3. The lap joint structure according to claim 2 wherein the hole is a through hole passing through the at least one of the sheet members.

4. The lap joint structure according to claim 2 wherein a shortest distance between an end part of the hole and an end part of the cutaway recessed part is 0.8K or more.

5. The lap joint structure according to claim 2 wherein the cutaway recessed part is formed in at least a sheet member where the hole is formed.

6. The lap joint structure according to claim 2 wherein the inside bottom part of the cutaway recessed part is formed sunken in from the end part of the overlapping part over a range of up to 1.5K or more.

7. The lap joint structure according to claim 1 wherein the hole is a through hole passing through the at least one of the sheet members.

8. The lap joint structure according to claim 7 wherein a shortest distance between an end part of the hole and an end part of the cutaway recessed part is 0.8K or more.

9. The lap joint structure according to claim 7 wherein the cutaway recessed part is formed in at least a sheet member where the hole is formed.

10. The lap joint structure according to claim 7 wherein the inside bottom part of the cutaway recessed part is formed sunken in from the end part of the overlapping part over a range of up to 1.5K or more.

11. The lap joint structure according to claim 1 wherein a shortest distance between an end part of the hole and an end part of the cutaway recessed part is 0.8K or more.

12. The lap joint structure according to claim 11 wherein the cutaway recessed part is formed in at least a sheet member where the hole is formed.

13. The lap joint structure according to claim 1 wherein the inside bottom part of the cutaway recessed part has a parallel part parallel with the end part of the overlapping part.

14. The lap joint structure according to claim 13 wherein a length of the parallel part is 0.5K or more.

15. The lap joint structure according to claim 1 wherein the cutaway recessed part is formed in at least a sheet member where the hole is formed.

16. The lap joint structure according to claim 1 wherein the inside bottom part of the cutaway recessed part is formed sunken in from the end part of the overlapping part over a range of up to 1.5K or more.

17. The lap joint structure according to claim 1 wherein the sheet member formed with the cutaway recessed part is a hat-shaped member with bent parts formed at an opposite side to the end part of the overlapping part across the joined parts and with a hat-shaped cross-section and the cutaway recessed part is formed over a range from the bent parts of the hat-shaped member to an end part side.

18. The lap joint structure according to claim 1 wherein the sheet members are steel sheet members and the cutaway recessed part is formed in a steel sheet member with a tensile strength of 590 MPa or more.

19. The lap joint structure according to claim 1 wherein the mechanical joining means are any of blind rivets, self piercing rivets, drill screws, bolts, and resistance element welding.

20. The lap joint structure according to claim 1 wherein joining by a resin is jointly used in addition to joining by the mechanical joining means or friction stir spot joining means.

* * * * *